April 19, 1966 R. H. PINTELL 3,247,468
PUSH-PULL CIRCUIT ARRANGEMENT
FOR GENERATING SINE WAVES
Filed March 15, 1962

INVENTOR:
ROBERT H. PINTELL

BY

Karl F. Ross

AGENT

United States Patent Office 3,247,468
Patented Apr. 19, 1966

3,247,468
PUSH-PULL CIRCUIT ARRANGEMENT FOR GENERATING SINE WAVES

Robert H. Pintell, Bronx, N.Y., assignor to Intron International, Inc., Bronx, N.Y., a corporation of New York
Filed Mar. 15, 1962, Ser. No. 179,866
12 Claims. (Cl. 331—113)

My present invention relates to a circuit arrangement for the generation of sine waves in response to a periodic input signal or as free-running oscillations.

In my copending application Ser. No. 738,585 filed May 28, 1958, now Patent No. 3,026,486, issued March 20, 1962, I have disclosed a system for producing such sine waves with the aid of a series-resonant and a parallel-resonant network connected in cascade with each other and tuned to substantially the same frequency, the resulting load circuit being energized by a switching circuit including a three-electrode electronic device, or a pair of such devices connected in push-pull, periodically rendered conductive for half a cycle of an operating frequency corresponding to the resonance frequency of the tuned networks.

In the preferred embodiment of my prior patent the three-element switching devices are constituted by transistors, yet the disclosure thereof also encompasses systems with switching devices of the breakdown type such as thyratrons. Such breakdown devices, as is well known, can be triggered into conductive condition by an input signal but can be rendered nonconductive only by an interruption of their output circuit or by the generation of a quenching potential of reverse polarity therein.

In conventional systems using push-pull-connected breakdown devices, such as thyratrons, ignitrons, controlled rectifiers, four-layer diodes or the like, it has been customary to bridge a so-called commutating condenser across the output electrodes of these devices to generate the quenching potential. In my copending application Ser. No. 117,168 filed June 14, 1961, related to the present one, I have disclosed the principle of resonant commutation, i.e. the replacement of the known commutating condenser by a resonant network in order to avoid the generation of large and wasteful switching currents inherent in the use of such capacitor.

My present invention has for its object the application of this principle of resonant commutation to a system for the generation of sine waves as generally disclosed in my aforementioned patent.

In accordance with this invention I modify the teachings of my patent by making the resonance frequencies of the cascade-connected series-tuned and parallel-tuned networks sufficiently different from each other to provide a residual capacitive reactance in the output of the switching device or devices, this reactance giving rise to the desired quenching potential without creating a flow of energy-dissipating shunt currents. More particularly, I prefer to maintain the resonance frequency of the parallel-tuned network at substantially the operating frequency of the system (e.g. as determined by the cadence of a train of signal pulses) and to make the series-tuned network resonate at a slightly higher frequency to create the capacitive reactance referred to. The difference between the two resonance frequencies, while sufficing to produce the necessary back voltage, must of course not be so large as to impede materially the flow of load current at the operating frequency, i.e. at the frequency of the parallel-tuned network which is also the fundamental switching frequency of the control circuit; at the same time the series-tuned network must be capable of effectively blocking the flow of harmonics of the operating frequency in the low-resistance condition of the switching device. I have found that the desideratum of a substantially pure sine-wave output and efficient operation can be realized if the resonance frequency of the series-tuned network lies between approximately 5% and 35% above that of the parallel-tuned network.

The invention, while particularly useful in connection with breakdown-type switching devices, can also be employed in signal-amplifying, filtering or oscillating circuits using amplifier-type switches (e.g. transistors or vacuum triodes) and may in general be applied to any of the systems disclosed in my above-identified patent.

Reference will now be made to the accompanying drawing for a description of selected embodiments. In the drawing.

Figure 1:
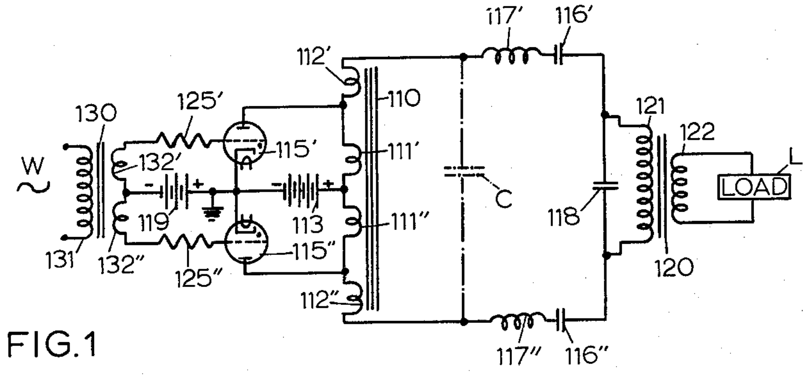
FIG. 1 is a circuit diagram of a signal amplifier according to the invention.

FIG. 1 shows a system for converting a distorted sine wave W into a purely sinusoidal and amplified oscillation applied to a load L. Wave W, which could also consist of a train of discontinuous pulses, is impressed upon the primary winding 131 of an input transformer 130 whose secondary winding consists of two halves 132′, 132″ respectively connected across the grid-cathode circuits of two thyratron tubes 115′, 115″ in series with a biasing battery 119. Resistors 125′, 125″ are also inserted in the input circuits of the thyratrons to minimize the flow of grid current. The plate-cathode circuits of these thyratrons are connected in push-pull across respective winding sections 111′, 111″ of an autotransformer 110, in series with a battery 113 representative of any conventional source of direct current, while a secondary circuit extends from the thyratron plates through other winding sections 112′, 112″ of the transformer, a first series-tuned network consisting of a capacitance 116′ and an inductance 117′, a parallel-tuned network consisting of a capacitance 118 and an inductance 121, and a second series-tuned network consisting of a capacitance 116″ and an inductance 117″. The inductance 121 also constitutes the primary winding of an output transformer 120 whose secondary 122 is connected across the load L. The networks 116′, 117′ and 116″, 117″ are, in effect, two halves of a single series-resonant circuit symmetrically connected between transformer 110 and network 118, 121.

In operation, positive pulses alternately appearing on the grids of thyratrons 115′ and 115″ ionize each thyratron during a respective half-cycle of the wave W. The voltage of battery 113 lies just above the sustaining potential of the thyratrons so that each of them, after having been triggered into conductive condition, remains operative until a sufficient back voltage is developed across the respective winding section 111′ or 111″ to quench it. This back voltage is the result of the capacitive reactance, indicated symbolically at C, of the circuit 116′, 116″, 117′, 117″, 118 and 121 as seen by the source 110 and 115′, 115″ which generates a square wave having the fundamental frequency $f_0$ of the input signal W. As explained before, circuits 116′, 117′ and 116″, 117″ are tuned to resonance at a frequencty $f_s$ higher than $f_0$ whereas circuit 118, 121 is resonant substantially at frequency $f_0$.

Figure 2:
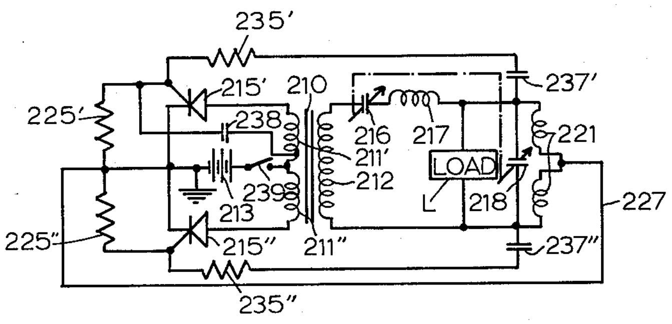
FIG. 2 is a circuit diagram of an oscillator representing another embodiment of the invention.

In the system of FIG. 2 the thyratrons 115′, 115″ of the preceding embodiment have been replaced by a pair of solid-state switching devices in the form of controlled rectifiers 215′, 215″ connected in push-pull across a battery 213. The anodes of these controlled rectifiers are energized from the positive terminal of battery 213 via respective halves 211′, 211″ of the primary winding of coupling transformer 210. The secondary winding 212 of this transformer is connected in series with reactances 216, 217 across the load L which is in shunt with the parallel-resonant tank circuit 218, 221; inductance 221 has its extremities connected, via respective resistors 235′, 235″ and feedback condensers 237′, 237″, to the gates of controlled rectifiers 215′, 215″ and has its midpoint returned to their grounded cathodes, and to the negative terminal of battery 213, through a lead 227. Input resistors 225′, 225″ are bridged across the gate-cathode circuits of the controlled rectifiers 215′, 215″. A starting circuit includes a condenser 238 which is connected between the junction of coils 211′, 211″ and the gate of controlled rectifier 215′ to initiate a discharge through this rectifier upon closure of a switch 239 in series with battery 213.

The system of FIG. 2, which operates as an oscillator by virtue of the feedback path through condensers 237′ and 237″, can be tuned to different operating frequencies by suitable adjustment of its reactances. Thus, I have shown condensers 216 and 218 to be adjustable and ganged together for the purpose of maintaining the frequency relationship between tuned circuits 216, 217 and 218, 221 as described in connection with FIG. 1.

Figure 3:
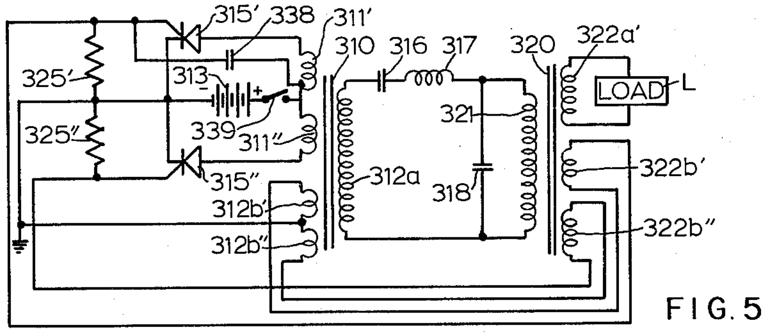
FIG. 3 is a circuit diagram similar to FIG. 2, showing a modified oscillator.

The oscillator of FIG. 3 represents a further refinement, similar to that shown in FIG. 9 of my Patent No. 3,025,711, in which the triggering of the switching devices 315′, 315″ is accelerated by regenerative square-wave feedback from coupling transformer 310 in addition to the sine-wave feedback from output transformer 320 designed to maintain the oscillations. Battery 313 is again connected across the anode-cathode path of each controlled rectifier 315′, 315″ in series with a respective winding half 311′, 311″ of transformer 310, the secondary **312*a* of this transformer delivering its output to circuit composed of a series-resonant network 316, 317 and a parallel-resonant network 318, 321 connected in cascade. Coil 321 represents, as in the system of FIG. 1, the primary of output transformer 320 whose secondary 322*a* feeds the load L. Two other secondaries 322*b*′, 322*b*″ form a feedback path extending from the gates of rectifiers 315′, 315″ through these secondaries, in series with further secondaries 312*b*′, 312*b*″ of transformer 310, to the grounded rectifier cathodes which are connected to their associated gates through respective input resistors 325′, 325″. A starting condenser 338 and switch 339** are provided as in the preceding embodiment.

It will be apparent that the frequency of the resonant network of FIGS. 1 and 3 may be adjusted, if desired, by suitable means such as those shown in FIG. 2. Also, balanced load circuits may be provided in the systems of FIGS. 2 and 3 by the use of two symmetrically disposed, substantially identical series-resonant networks as illustrated in FIG. 1.

Figure 4:
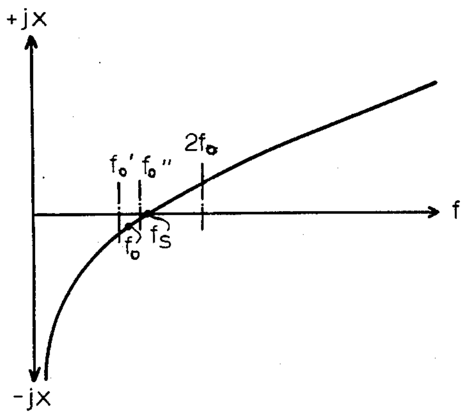
FIG. 4 is a graph illustrating the relationship of the resonance frequencies in a system embodying the principles of this invention.

FIG. 4 shows the reactance $jX$ of the series-tuned network 116′, 117′ or 116″, 117″ and its counterparts of FIGS. 2 and 3 as seen from a source of variable frequency. In the region of frequency $f_0$, which as stated is lower than the resonance frequency $f_s$ of this circuit, the reactance is of capacitive character (as expressed by the negative sign) and of a magnitude sufficient to produce the necessary quenching potential for the associated switching devices. The relationship between frequencies $f_s$ and $f_0$ is so chosen that the impedance of the series-tuned network will be high at and above $2f_0$, compared with this impedance at $f_0$, so that this network will strongly discriminate against second-order and higher harmonics of the fundamental frequency; thus, $f_0$ advantageously lies between a lower limit $f_0'=0.75f_s$ and an upper limit $f_0''=0.95f_s$. Very good results have been obtained with a system in which $f_s$ exceeds $f_0$ by about 25%, i.e. $f_0=0.8f_s$, as noted in my copending application Ser. No. 117,168 referred to above.

Figure 5:
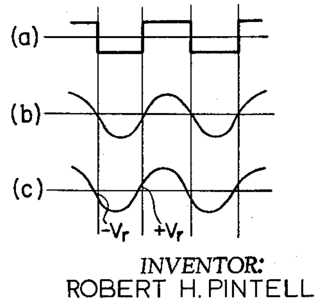
FIG. 5 is a set of explanatory graphs showing the relative phasing of voltages and currents.

In FIG. 5, graph (*a*) shows the conductive and non-conductive conditions of the switching devices 115′, 115″ etc.; graph (*b*) represents the sinusoidal current flow through the output circuit 116′, 117′, 116″, 117″, 118, 121 whereas graph (*c*) depicts the counter-E.M.F. of the reactive circuit which, owing to the capacitive character of the series-circuit reactance, leads the sinusoidal current so as to give rise to a voltage component $-V_r$, $+V_r$ at the precise instants when the current wave goes through zero at the end of a positive or negative half-cycle, this voltage component assisting in the quenching of the switching devices at the proper times as set forth above.

It will be understood by persons skilled in the art that any load reactances connected across or otherwise coupled to the parallel-resonant network should be considered in the tuning thereof. Thus, the oscillatory systems of FIGS. 2 and 3 will operate at the frequency of their parallel-resonant networks as modified by these load reactances whereas the filtering effect of the system of FIG. 1 will be an optimum if the wave W has a frequency equaling the resonant frequency of network 118, 121 as altered by the load.

The invention is not restricted to push-pull systems but may be used in conjunction with single-ended or unbalanced circuits, e.g. as derived from the illustrated embodiments by the omission of the branches containing the double-primed elements thereof. These and other modifications are believed to be readily apparent to persons skilled in the art and intended to be embraced in the spirit and scope of the appended claims.

I claim:

1. In an amplifier for sinusoidal waves, in combination, a control circuit including a source of electromotive force and an output circuit connecting said control circuit to a load; said control circuit comprising switch means connected across said source, and circuit means connecting said switch means to an external source of alternating voltage for periodically intermittently triggering said switch means into a conductive condition at a predetermined cadence, thereby producing a square wave having a fundamental frequency related to said cadence; said output circuit comprising a parallel-resonant network tuned to substantially said fundamental frequency when coupled to said load, and at least one series-resonant network in series with said parallel-resonant network tuned to a resonance frequency higher than said fundamental frequency whereby said output circuit presents to said control circuit a capacitive reactance.

2. In a generator for sinusoidal waves, in combination, a control circuit including a source of electromotive force and an output circuit connecting said control circuit to a load; said control circuit comprising switch means connected across said source, and circuit means coupled with said switch means for intermittently triggering said switch means into a conductive condition at a predetermined cadence, thereby producing a square wave having a fundamental frequency related to said cadence, said circuit means including means for producing an alternating voltage with a frequency equal to said cadence; said output circuit comprising a parallel-resonant network tuned to substantially said fundamental frequency when coupled to said load, and at least one series-resonant network in series with said parallel-resonant network tuned to a resonance frequency exceeding said fundamental frequency by substantially 5% to 35% whereby said output circuit presents to said control circuit a capacitive reactance.

3. In an amplifier for sinusoidal waves, in combination, a control circuit including a source of electromotive force and an output circuit connecting said control circuit to a load; said control circuit comprising breakdown-type switch means connected across said source, and circuit means connecting said switch means to an external source of alternating voltage for intermittently triggering said switch means into a conductive condition at a predetermined cadence, thereby producing a square wave having a fundamental frequency related to said cadence; said output circuit comprising a parallel-resonant network tuned to substantially said fundamental frequency when coupled to said load, and at least one series-resonant network in series with said parallel-resonant network tuned to a resonance frequency higher than said fundamental frequency whereby said output circuit presents to said control circuit a capacitive reactance for producing a reverse voltage in series with said source sufficient to quench said switch means.

4. In a generator for sinusoidal waves, in combination a control circuit including a source of electromotive force and an output circuit connecting said control circuit to a load; said control circuit comprising breakdown-type switch means connected across said source, and circuit means coupled with said switch means for intermittently triggering said switch means into a conductive condition at a predetermined cadence, thereby producing a square wave having a fundamental frequency related to said cadence, said circuit means including means for producing an alternating voltage with a frequency equal to said cadence; said output circuit comprising a parallel-resonant network tuned to substantially said fundamental frequency when coupled to said load, and at least one series-resonant network in series with said parallel-resonant network tuned to a resonance frequency exceeding said fundamental frequency by substantially 5% to 35% whereby said output circuit presents to said control circuit a capacitive reactance for producing a reverse voltage in series with said source sufficient to quench said switch means.

5. In an amplifier for sinusoidal waves, in combination, a control circuit including a source of electromotive force and an output circuit connecting said control circuit to a load; said control circuit comprising a pair of switching devices connected in push-pull across said source, and circuit means connecting said devices across an external source of alternating voltage for alternately triggering said devices into a conductive condition at a predetermined cadence, thereby producing a square wave having a fundamental frequency related to said cadence; said output circuit comprising a parallel-resonant network tuned to substantially said fundamental frequency when coupled to said load, and at least one series-resonant network in series with said parallel-resonant network tuned to a resonance frequency higher than said fundamental frequency whereby said output circuit presents to said control circuit a capacitive reactance sufficient to effect the alternate quenching of said devices.

6. In a generator for sinusoidal waves, in combination, a control circuit including a source of electromotive force and an output circuit connecting said control circuit to a load; said control circuit comprising a pair of switching devices connected in push-pull across said source, and circuit means coupled with said devices for alternately triggering said devices into a conductive condition at a predetermined cadence, thereby producing a square wave having a fundamental frequency related to said cadence, said circuit means including means for producing an alternating voltage with a frequency equal to said cadence; said output circuit comprising a parallel-resonant network tuned to substantially said fundamental frequency when coupled to said load, and at least one series-resonant network in series with said parallel-resonant network tuned to a resonance frequency exceeding said fundamental frequency by substantially 5% to 35% whereby said output circuit presents to said control circuit a capacitive reactance sufficient to effect the alternate quenching of said devices.

7. In a generator for sinusoidal waves, in combination, a control circuit including a source of electromotive force and an output circuit connecting said control circuit to a load; said control circuit comprising a pair of electronic breakdown devices connected in push-pull across said source, and circuit means coupled with said devices for alternately triggering said devices into a conductive condition at a predetermined cadence, thereby producing a square wave having a fundamental frequency related to said cadence, said circuit means including means for producing an alternating voltage with a frequency equal to said cadence; said output circuit comprising a parallel-resonant network tuned to substantially said fundamental frequency when coupled to said load, and at least one series-resonant network in series with said parallel-resonant network tuned to a resonance frequency exceeding said fundamental frequency by substantially 5% to 35% whereby said output circuit presents to said control circuit a capacitive reactance for producing a reverse voltage in series with said source sufficient to effect the alternate quenching of said devices.

8. In an amplifier for sinusoidal waves, in combination, a control circuit including a source of direct current and an output circuit connecting said control circuit to a load; said control circuit comprising a pair of switching devices connected in push-pull across said source, input electrodes on said devices and circuit means connecting said electrodes across an external source of alternating voltage for alternately triggering said devices into a conductive condition at a predetermined cadence, thereby producing a square wave having a fundamental frequency related to said cadence; said output circuit comprising a parallel-resonant network tuned to substantially said fundamental frequency when coupled to said load, and at least one series-resonant network in series with said parallel-resonant network tuned to a resonance frequency higher than said fundamental frequency whereby said output circuit presents to said control circuit a capacitive reactance in series with said source.

9. In a generator for sinusoidal waves, in combination, a control circuit including a source of direct current and an output circuit connecting said control circuit to a load; said control circuit comprising a pair of switching devices connected in push-pull across said source, input electrodes on said devices and circuit means coupled with said electrodes for alternately triggering said devices into a conductive condition at a predetermined cadence, thereby producing a square wave having a fundamental frequency related to said cadence, said circuit means including means for producing an alternating voltage with a frequency equal to said cadence; said output circuit comprising a parallel-resonant network tuned to substantially said fundamental frequency when coupled to said load; and at least one series-resonant network in series with said parallel-resonant network tuned to a resonance frequency exceeding said fundamental frequency by substantially 5% to 35% whereby said output circuit presents to said control circuit a capacitive reactance in series with said source.

10. In an amplifier for sinusoidal waves, in combination, a control circuit including a source of direct current and an output circuit connecting said control circuit to a load; said control circuit comprising a pair of electronic breakdown devices connected in push-pull across said source, input electrodes on said devices and circuit means connecting said electrodes across an external source of alternating current for alternately triggering said devices into a conductive condition at a predetermined cadence, thereby producing a square wave having a fundamental frequency related to said cadence, said circuit means including means for producing an alternating voltage with a frequency equal to said cadence; said output circuit comprising a parallel-resonant network tuned to substantially said fundamental frequency when coupled to said load, and at least one series-resonant network in series with said parallel-resonant network tuned to a resonance frequency higher than said fundamental frequency whereby said output circuit presents to said control circuit a capacitive reactance for producing a reverse voltage in series with said source sufficient to effect the alternate quenching of said devices.

11. In a generator for sinusoidal waves, in combination, a control circuit including a source of direct current and an output circuit connecting said control circuit to a load; said control circuit comprising a pair of electronic breakdown devices connected in push-pull across said source, input electrodes on said devices and circuit means coupled with said electrodes for alternately triggering said devices into a conductive condition at a predetermined cadence, thereby producing a square wave having a fundamental frequency related to said cadence, said circuit means including means for producing an alternating voltage with a frequency equal to said cadence; said output circuit comprising a parallel-resonant network tuned to substantially said fundamental frequency when coupled to said load, and at least one series-resonant network in series with said parallel-resonant network tuned to a resonance frequency exceeding said fundamental frequency by substantially 5% to 35% whereby said output circuit presents to said control circuit a capacitive reactance for producing a reverse voltage in series with said source sufficient to effect the alternative quenching of said devices.

12. The combination according to claim 11 wherein said circuit means comprises a regenerative feedback connection from said output circuit to said electrodes, said connection constituting the means for producing said alternating voltage.

References Cited by the Examiner

UNITED STATES PATENTS

| | | | |
|---|---|---|---|
| 2,732,499 | 1/1956 | Bunblasky et al. | 331—128 |
| 2,968,738 | 1/1961 | Pintell. | |
| 3,026,486 | 3/1962 | Pintell | 331—117 X |
| 3,088,075 | 4/1963 | Pintell. | |
| 3,118,105 | 1/1964 | Relation et al. | 331—113 |

OTHER REFERENCES

Article by Sager in Communication and Electronics, November 1961, pages 513–518.

ROY LAKE, *Primary Examiner.*

JOHN KOMINSKI, *Examiner.*